United States Patent
Azuma et al.

(10) Patent No.: US 11,062,273 B2
(45) Date of Patent: Jul. 13, 2021

(54) PLANT MAINTENANCE ASSISTING SYSTEM

(71) Applicant: MITSUBISHI HEAVY INDUSTRIES, LTD., Tokyo (JP)

(72) Inventors: Takashi Azuma, Tokyo (JP); Kenji Mashio, Tokyo (JP); Takae Yamashita, Tokyo (JP); Susumu Shiizuka, Tokyo (JP); Junichi Nishitani, Tokyo (JP); Masafumi Utsumi, Tokyo (JP); Jun Shibuya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 825 days.

(21) Appl. No.: 15/739,852

(22) PCT Filed: Mar. 7, 2016

(86) PCT No.: PCT/JP2016/057004
§ 371 (c)(1),
(2) Date: Dec. 26, 2017

(87) PCT Pub. No.: WO2017/051548
PCT Pub. Date: Mar. 30, 2017

(65) Prior Publication Data
US 2020/0042952 A1 Feb. 6, 2020

(30) Foreign Application Priority Data
Sep. 25, 2015 (JP) .............................. JP2015-188602

(51) Int. Cl.
*G06Q 10/00* (2012.01)
*G05B 23/02* (2006.01)
*G06Q 10/06* (2012.01)

(52) U.S. Cl.
CPC ......... *G06Q 10/20* (2013.01); *G05B 23/0259* (2013.01); *G06Q 10/0635* (2013.01)

(58) Field of Classification Search
None
See application file for complete search history.

(56) References Cited

U.S. PATENT DOCUMENTS

| 2012/0130759 A1* | 5/2012 | Davenport | G06Q 10/0631 705/7.12 |
| 2012/0173300 A1* | 7/2012 | Davenport | G06Q 99/00 705/7.28 |
| 2015/0134400 A1* | 5/2015 | Kashi | G06Q 10/0635 705/7.28 |

FOREIGN PATENT DOCUMENTS

| JP | 7-270574 A | 10/1995 |
| JP | 9-97285 A | 4/1997 |

(Continued)

OTHER PUBLICATIONS

International Search Report w/English translation and Written Opinion in Japanese dated Apr. 12, 2016, issued in counterpart International Application No. PCT/JP2016/057004 (9 pages).

*Primary Examiner* — Cory W Eskridge
(74) *Attorney, Agent, or Firm* — Westerman, Hattori, Daniels & Adrian, LLP

(57) ABSTRACT

A plant maintenance assisting system is provided with: an abnormality indication monitoring system; an abnormality diagnosis system; a maintenance plan creation system; a risk evaluation system; and a component management system. On the basis of risk information and abnormality diagnosis information that is a result of diagnosis by the abnormality diagnosis system, the risk evaluation system determines the need for maintenance work with respect to an abnormality indicating facility. In a case where it is determined that maintenance work with respect to the abnormality indicating (Continued)

facility is necessary, the maintenance plan creation system sets, in a maintenance plan, maintenance implementation timing of maintenance work with respect to a facility including the abnormality indicating facility. On the basis of component management information, the component management system determines whether a component can be procured at the maintenance implementation timing set by the maintenance plan creation system.

5 Claims, 3 Drawing Sheets

(56) References Cited

FOREIGN PATENT DOCUMENTS

| | | |
|---|---|---|
| JP | 2004-191359 A | 7/2004 |
| JP | 2004-240642 A | 8/2004 |
| JP | 2006-252311 A | 9/2006 |
| JP | 2011-76334 A | 4/2011 |
| JP | 2011-227706 A | 11/2011 |

* cited by examiner

FIG. 2

| FACILITY NAME | #1 OPERATION INSPECTION | #1 OPERATION INSPECTION | #2 OPERATION INSPECTION | #2 OPERATION INSPECTION | #3 OPERATION INSPECTION | #3 OPERATION INSPECTION | #4 OPERATION INSPECTION | #4 OPERATION INSPECTION | #5 OPERATION INSPECTION | #5 OPERATION INSPECTION |
|---|---|---|---|---|---|---|---|---|---|---|
| ○○ PUMP A | FULL-SCALE | | | | | | | | | |
| ○○ PUMP B | | | | | | | | | SIMPLE | |
| △△ PUMP A | | SIMPLE | | FULL-SCALE | | SIMPLE | | SIMPLE | | FULL-SCALE |
| △△ PUMP B | | SIMPLE | | SIMPLE | | FULL-SCALE | | | | SIMPLE |
| ×× PUMP A | | FULL-SCALE | | | | SIMPLE | | | | FULL-SCALE |
| ×× PUMP B | | | | | | SIMPLE | | SIMPLE | | |
| ... | ... | ... | ... | ... | ... | ... | ... | ... | ... | ... |

PLANT MAINTENANCE ASSISTING SYSTEM

TECHNICAL FIELD

The present invention relates to a plant maintenance assisting system that creates a maintenance plan of a nuclear power plant.

BACKGROUND ART

Hitherto, a maintenance assisting device of a plant instrument has been known which is constituted by a state diagnosis unit that diagnoses plant instrument abnormality, a plant operation influence evaluation unit that evaluates an influence of plant instrument abnormality on a plant operation using information of the diagnosis by the state diagnosis unit, and an inspection method/timing determination unit that determines an inspection method and inspection timing of the plant instrument using results obtained in the state diagnosis unit and the plant operation influence evaluation unit (see, for example, PTL 1).

CITATION LIST

Patent Literature

[PTL 1] Japanese Unexamined Patent Application Publication No. 2004-240642

SUMMARY OF INVENTION

Technical Problem

Normally, in order to safely operate a nuclear power plant, the maintenance and inspection of a nuclear power plant are performed on the basis of a maintenance plan. The maintenance plan is designed on the basis of the degree of importance of facilities of the nuclear power plant, the inspection timing of the facilities, the replacement timing of expendable supplies of the facilities, and the like. In order to optimize the maintenance plan to be designed, it is preferable to consider the generation of an abnormality indication of the nuclear power plant. In this point, in the maintenance assisting device of PTL 1, an inspection method and inspection timing are determined on the basis of the diagnosis results obtained in the state diagnosis unit. However, in the nuclear power plant, components such as expendable supplies of the facilities are sometimes replaced during maintenance work, and it is difficult to efficiently perform maintenance work with respect to the nuclear power plant in a case where components are not able to be procured at determined inspection timing. In addition, in a case where the inspection timing is determined, it is necessary to consider a risk given to the nuclear power plant in addition to the generation of an abnormality indication of the nuclear power plant. Meanwhile, the risk is generally calculated by probabilistic risk assessment (PRA).

Consequently, an object of the present invention is to provide a plant maintenance assisting system capable of efficiently performing maintenance work with respect to a nuclear power plant in a case where an abnormality indication is generated in the nuclear power plant.

Solution to Problem

According to the present invention, there is provided a plant maintenance assisting system including: an abnormality indication monitoring system that detects an abnormality indication of a nuclear power plant; an abnormality diagnosis system that specifies an abnormal event of the nuclear power plant on the basis of a result of the detection of the abnormality indication, specifies an abnormality indicating facility associated with the specified abnormal event, and generates abnormality diagnosis information including information relating to the abnormal event and the abnormality indicating facility which are specified; a maintenance plan creation system that creates a maintenance plan of the nuclear power plant; a risk evaluation system that evaluates risk occurring in the nuclear power plant due to standby exception of a facility including the abnormality indicating facility, and generates risk information as a result of the evaluation; and a component management system that has component management information for managing a component used in the nuclear power plant, wherein the risk evaluation system determines a need for maintenance work with respect to the abnormality indicating facility on the basis of the risk information and the abnormality diagnosis information, wherein in a case where it is determined that the maintenance work with respect to the abnormality indicating facility is necessary, the maintenance plan creation system sets maintenance implementation timing of maintenance work with respect to the facility including the abnormality indicating facility, in the maintenance plan, and wherein the component management system determines whether the component is able to be procured on the basis of the component management information, at the maintenance implementation timing which is set by the maintenance plan creation system.

According to such a configuration, in a case where an abnormality indication is generated in the nuclear power plant, it is possible to determine the need for maintenance work with respect to the abnormality indicating facility, on the basis of the risk information and the abnormality diagnosis information. In a case where maintenance work with respect to the abnormality indicating facility is necessary, it is possible to preferentially set the maintenance implementation timing of maintenance work with respect to the abnormality indicating facility, in the maintenance plan. In this case, the component management system can determine whether the component is able to be appropriately procured at the maintenance implementation timing. That is, in a case where the component is not able to be procured at the maintenance implementation timing, it is possible to take a measure to procure the component at the maintenance implementation timing. Thus, even in a case where an abnormality indication is generated in the nuclear power plant, and maintenance work with respect to the abnormality indicating facility is performed, the component can be appropriately procured at the maintenance implementation timing, and thus it is possible to efficiently perform maintenance work with respect to the nuclear power plant. Meanwhile, an example of the risk information includes core damage probability, storage container breakage probability or the like calculated by probabilistic risk assessment (PRA).

In addition, it is preferable that, in a case where it is determined that the component is able to be procured at the maintenance implementation timing on the basis of the component management information, the component management system procures the component at the maintenance implementation timing, and that, in a case where the component is not able to be procured at the maintenance implementation timing, the component management system requests resetting of the maintenance implementation timing from the maintenance plan creation system so that the maintenance implementation timing is set to timing at which the component is able to be procured.

According to such a configuration, even in a case where the component is not able to be procured at the maintenance implementation timing, the maintenance implementation timing is reset to timing at which the component can be procured, and thus it is possible to reliably procure the component at the maintenance implementation timing.

In addition, it is preferable that the component management information includes stock information relating to a quantity in stock of the component, and that the component management system updates the stock information so that the quantity in stock of the component is set to a quantity in stock compatible with the maintenance plan, on the basis of the maintenance plan which is set by the maintenance plan creation system.

According to such a configuration, it is possible to set the quantity in stock of the component to an optimal number with respect to the maintenance plan in which the maintenance implementation timing of the abnormality indicating facility is set.

In addition, it is preferable that the risk evaluation system updates the risk information after implementation of the maintenance work with respect to the abnormality indicating facility.

According to such a configuration, the abnormality indicating facility in which maintenance work is performed becomes a normal facility, and thus a risk occurring in the nuclear power plant is revaluated, thereby allowing the maintenance plan to be appropriately created on the basis of latest risk information.

In addition, it is preferable to further include a remaining life evaluation system that evaluates a remaining life of a facility provided in the nuclear power plant, and preferable that the risk evaluation system determines a need for maintenance work with respect to the abnormality indicating facility, on the basis of remaining life information of the abnormality indicating facility evaluated in the remaining life evaluation system, the risk information and the abnormality diagnosis information.

According to such a configuration, the remaining life of the abnormality indicating facility can be considered, and thus it is possible to appropriately determine the need for maintenance work with respect to the abnormality indicating facility.

BRIEF DESCRIPTION OF DRAWINGS

FIG. 2 is a diagram illustrating a maintenance plan.

DESCRIPTION OF EMBODIMENTS

Hereinafter, an embodiment according to the present invention will be described in detail with reference to the accompanying drawings. Meanwhile, it is not intended that the invention is not limited to this embodiment. In addition, components in the following embodiment include components which are easily replaceable by those skilled in the art or substantially the same components. Further, components described below can be appropriately combined. In addition, in a case where there are a plurality of embodiments, the respective embodiments can also be combined.

Embodiment

Figure 1:
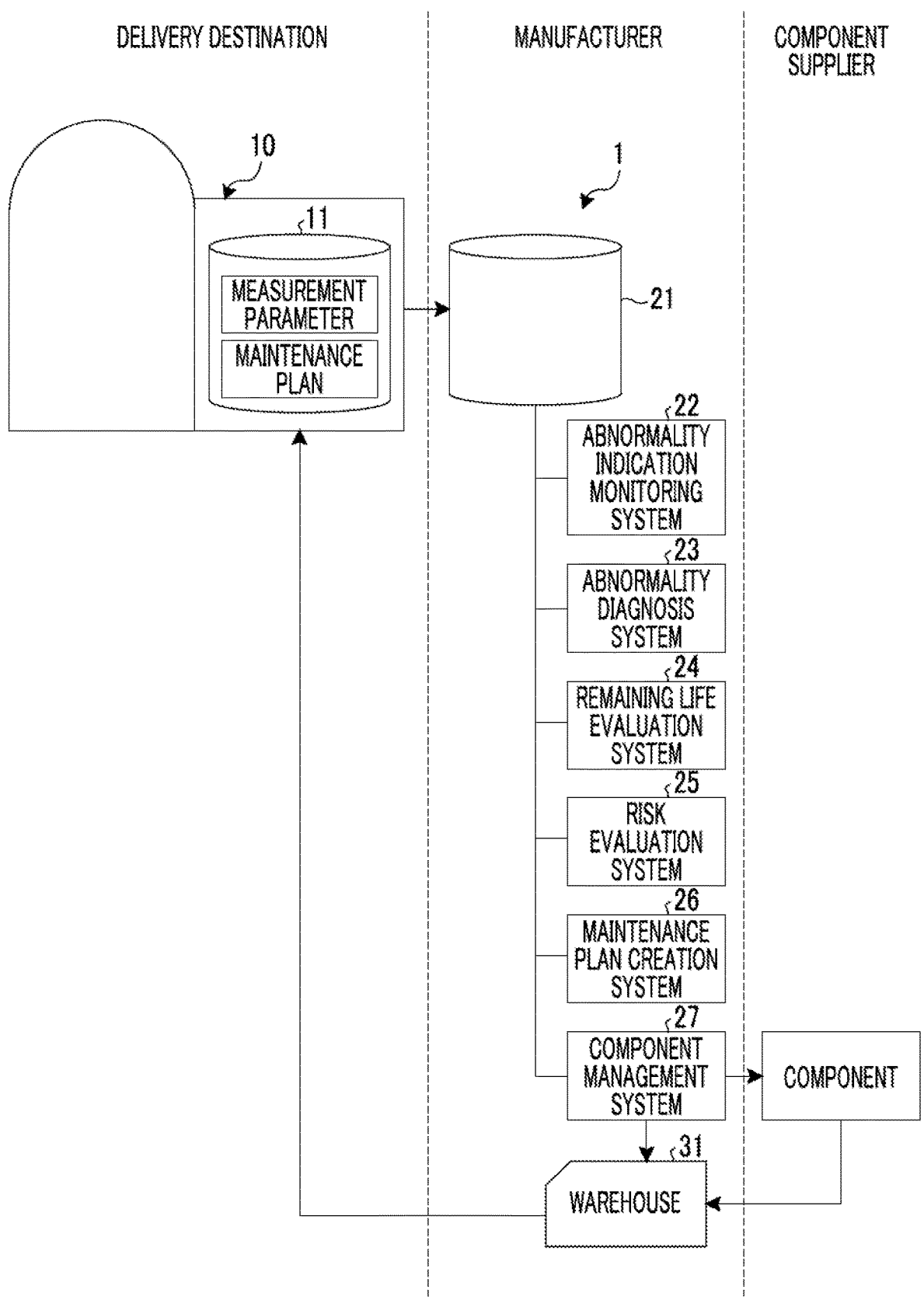
FIG. 1 is a schematic configuration diagram illustrating a plant maintenance assisting system according to the present embodiment.

FIG. 1 is a schematic configuration diagram illustrating a plant maintenance assisting system according to the present embodiment. As shown in FIG. 1, a plant maintenance assisting system 1 according to the present embodiment is a system that assists the maintenance of a nuclear power generation plant (nuclear power plant) 10 installed at a delivery destination. In the present embodiment, a case is described in which the plant maintenance assisting system 1 is possessed by a manufacturer that has manufactured (built) the nuclear power generation plant 10. Meanwhile, the plant maintenance assisting system 1 may have a portion of a plurality of systems constituting the plant maintenance assisting system 1 disposed at the delivery destination, and has no particular limitation on the configuration of the system. Here, the nuclear power generation plant 10 which is put in practice in the delivery destination will be described prior to the description of the plant maintenance assisting system 1.

The delivery destination includes a delivery-side database 11 managed in the delivery destination. A plurality of measurement parameters which are respectively output from a plurality of measurement instruments provided in the nuclear power generation plant 10 are stored, as plant operation data, in the delivery-side database 11 provided in the delivery destination. In addition, maintenance plan data relating to a maintenance plan created in the delivery destination is stored in this delivery-side database 11. Meanwhile, various pieces of data including the measurement parameters and the maintenance plan data mentioned above are stored in the delivery-side database 11.

The plant maintenance assisting system 1 provided in the manufacturer is provided with a manufacture-side database 21 that stores various pieces of data provided from the delivery destination, and stores various pieces of data used in the plant maintenance assisting system 1. In addition, the plant maintenance assisting system 1 is configured to include an abnormality indication monitoring system 22, an abnormality diagnosis system 23, a remaining life evaluation system 24, a risk evaluation system 25, a maintenance plan creation system 26, and a component management system 27. Meanwhile, the plant maintenance assisting system 1 may be configured such that the respective systems 21, 22, 23, 24, 25, 26, and 27 are integrated with each other, or that the respective systems 21, 22, 23, 24, 25, 26, and 27 are independent with each other, while there is no particular limitation on the configuration thereof.

The manufacture-side database 21 is connected to the delivery-side database 11, and is configured using a hardware resource such as a storage device. The manufacture-side database 21 is configured to be communicable with the delivery-side database 11 about various pieces of data, and acquires and stores, for example, the plant operation data and the maintenance plan data which are stored in the delivery-side database 11. In addition, the manufacture-side database 21 is connected to the respective systems 21, 22, 23, 24, 25, 26, and 27, and outputs predetermined data toward the respective systems 21, 22, 23, 24, 25, 26, and 27 on the basis of requests from the respective systems 21, 22, 23, 24, 25, 26, and 27. Further, the manufacture-side database 21 acquires and stores predetermined data provided from the respective systems 21, 22, 23, 24, 25, 26, and 27.

The abnormality indication monitoring system 22 detects an abnormality indication of the nuclear power generation plant 10 on the basis of correlation values indicating mutual correlation between a plurality of measurement parameters acquired from the manufacture-side database 21. Specifically, the abnormality indication monitoring system 22 derives correlation values indicating of correlation strength between two measurement parameters out of the plurality of measurement parameters. The abnormality indication monitoring system 22 uses a correlation value, obtained by adding up correlation values of all the derived measurement parameters, as a monitoring instruction value. The abnormality indication monitoring system 22 determines (detects) that the abnormality indication is present in a case where a threshold for determining whether or not being an abnormality indication is set in advance and the monitoring instruction value exceeds the threshold, and determines (undetects) that the abnormality indication is not present in a case where the monitoring instruction value is equal to or less than the threshold. In a case where it is detected that the abnormality indication is present, the abnormality indication monitoring system 22 outputs a result of the detection of the abnormality indication to the abnormality diagnosis system 23. Meanwhile, the abnormality indication monitoring system 22 is not limited to the above configuration, and may have any configuration insofar as the system detects the abnormality indication of the nuclear power generation plant 10.

The abnormality diagnosis system 23 acquires a result of the detection of the abnormality indication of the nuclear power generation plant 10, and diagnoses the abnormality of the nuclear power generation plant 10 on the basis of the acquired result of the detection of the abnormality indication. Specifically, the abnormality diagnosis system 23 diagnoses the abnormality using data relating to abnormality stored in the manufacture-side database 21. The data relating to abnormality is information including an abnormal event of the nuclear power generation plant 10, an abnormality indicating facility associated with the abnormal event, a measure against abnormality associated with the abnormal event, and an abnormality indication detection result associated with the abnormal event. On the basis of the abnormality indication detection result acquired from the abnormality indication monitoring system 22, the abnormality diagnosis system 23 specifies an abnormal event, and specifies an abnormality indicating facility and a measure against abnormality which are associated with the abnormal event. The abnormality diagnosis system 23 generates abnormality diagnosis information including information relating to the abnormal event and the abnormality indicating facility which are specified, and stores the generated information in the manufacture-side database 21.

The remaining life evaluation system 24 evaluates the remaining life of each facility constituting the nuclear power generation plant 10. The remaining life evaluation system 24 evaluates the remaining life of the facility on the basis of plant operation data acquired from the manufacture-side database 21, generates remaining life information relating to the remaining life of each facility as a result of the evaluation, and stores the generated information in the manufacture-side database 21. In addition, the remaining life evaluation system 24 evaluates the remaining life of an abnormality indicating facility specified as an abnormality indication being present, generates remaining life information relating to the remaining life of the abnormality indicating facility as a result of the evaluation, and stores the generated information in the manufacture-side database 21.

The risk evaluation system 25 evaluates a risk occurring in the nuclear power generation plant 10 due to the standby exception of a facility including the abnormality indicating facility, generates risk information as a result of the evaluation, and stores the generated information in the manufacture-side database 21. Meanwhile, an example of the risk information to be used includes a core damage probability, a storage container breakage probability or the like calculated by probabilistic risk assessment (PRA).

The maintenance plan creation system 26 creates a maintenance plan of the nuclear power generation plant 10. The maintenance plan creation system 26 acquires a maintenance plan, abnormality diagnosis information and risk information from the manufacture-side database 21. The maintenance plan creation system 26 determines the need for maintenance work with respect to an abnormality indicating facility, on the basis of the abnormality diagnosis information and the risk information which are acquired. In addition, in a case where it is determined that maintenance work with respect to the abnormality indicating facility is necessary, the maintenance plan creation system 26 sets maintenance implementation timing of maintenance work with respect to a facility including the abnormality indicating facility, on the basis of the acquired maintenance plan. Meanwhile, in a case where the maintenance implementation timing of maintenance work with respect to the abnormality indicating facility is set, the maintenance plan creation system 26 sets timing earlier than maintenance implementation timing which is set in advance in order to preferentially perform maintenance work on the abnormality indicating facility.

FIG. 2 is a diagram illustrating a maintenance plan. A maintenance plan which is acquired from the manufacture-side database 21 has the facilities of the nuclear power generation plant 10 and the maintenance implementation timings of the facilities associated with each other, for example, as shown in FIG. 2. FIG. 2 is configured such that its left items are items of the facilities, and that its right items of the items of the facilities are maintenance implementation timings. Meanwhile, the maintenance implementation timing includes periodic inspection timing performed during the periodic inspection of the nuclear power generation plant 10 and online maintenance timing performed during the operation period of the nuclear power generation plant 10. Meanwhile, in FIG. 2, the periodic inspection timing is represented by "#1 inspection", "#2 inspection" . . . in time-series order, and the online maintenance period is represented by "#1 operation", "#2 operation" . . . in time-series order. Although described later in detail, in FIG. 2, the abnormality indicating facility is set to "xx pump B", and the maintenance implementation timing of the "xx pump B" is reset from "#4 operation" to "#3 operation".

The component management system 27 manages a component used in the maintenance work of the nuclear power generation plant 10 on the basis of component management information for managing the component. The component management system 27 procures a component used in each facility at maintenance implementation timing, on the basis of the maintenance plan. The component management system 27 determines whether spare parts of a component are present in a warehouse 31 in a case where the component is procured, and orders the component from a component supplier in a case where there is no spare part. On the other hand, in a case where spare parts are present in the warehouse 31, the component management system 27 delivers the component from the warehouse 31 to a delivery destination.

In addition, the component management information includes stock information relating to the quantity in stock of a component. The component management system 27 updates the stock information so that the quantity in stock of a component is set to the quantity in stock necessary and sufficient for the maintenance plan, on the basis of the maintenance plan which is set by the maintenance plan creation system 26. That is, the component management system 27 automatically updates the stock information so that the quantity in stock of a component is set to an optimal number every time the maintenance plan is updated (reset).

Next, the operation of the plant maintenance assisting system 1 when an abnormality indication is detected will be described. In the plant maintenance assisting system 1, in a case where the abnormality indication monitoring system 22 detects an abnormality indication, the abnormality indication monitoring system 22 outputs an abnormality indication detection result to the abnormality diagnosis system 23. In a case where the abnormality indication detection result is acquired, the abnormality diagnosis system 23 specifies an abnormality indicating facility, generates abnormality diagnosis information including information relating to the specified abnormality indicating facility, and stores the generated abnormality diagnosis information in the manufacture-side database 21.

In a case where the abnormality diagnosis information stored in the manufacture-side database 21 is acquired, the risk evaluation system 25 acquires risk information of the abnormality indicating facility and remaining life information of the abnormality indicating facility generated in the remaining life evaluation system 24. The risk evaluation system 25 revaluates the risk information of the abnormality indicating facility on the basis of the abnormality diagnosis information, the risk information and the remaining life information, and determines the need for maintenance work with respect to the abnormality indicating facility on the basis of a result of the revaluation. That is, an facility in which its abnormality indication is detected decreases in remaining life, and thus the revaluated risk information indicates an increase in risk. Therefore, the risk evaluation system 25 determines that maintenance work with respect to the abnormality indicating facility is necessary in a case where the revaluated risk of the abnormality indicating facility becomes larger than a threshold which is set in advance at maintenance implementation timing which is set in advance in the maintenance plan. On the other hand, in a case where the revaluated risk is set to be equal to or less than the threshold which is set in advance, the risk evaluation system 25 determines that maintenance work with respect to the abnormality indicating facility is not necessary.

In a case where it is determined that maintenance work with respect to the abnormality indicating facility is necessary in the risk evaluation system 25, the maintenance plan creation system 26 performs resetting so that the maintenance implementation timing of the abnormality indicating facility becomes earlier. Here, the resetting of the maintenance implementation timing of the abnormality indicating facility will be described with reference to FIG. 3.

Figure 3:
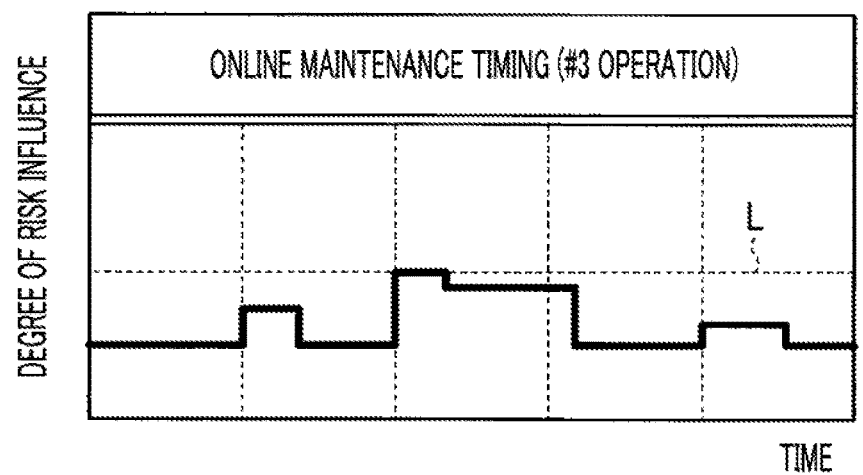
FIG. 3 is a diagram illustrating abnormality indicating facilities and risk information.

FIG. 3 is a diagram illustrating abnormality indicating facilities and risk information. As shown in FIG. 3, risk information to be generated is treated as the digitized degree of risk influence as an example. Here, in FIG. 3, the abnormality indicating facility is "xx pump B". FIG. 3 shows the degree of risk influence when standby exception of a plurality of facilities including the "xx pump B" is performed in a case where maintenance work of these facilities is performed. Meanwhile, the standby exception refers to release of a standby state in order to perform maintenance work on a facility which is in a standby state.

As shown in FIG. 2, in the "xx pump B", the maintenance implementation timing of the maintenance plan created in advance is set to "#4 operation". The maintenance implementation timing of the "xx pump B" is reset to "#3 operation" by the maintenance plan creation system 26. The risk evaluation system 25 evaluates the degree of risk influence during the "#3 operation". In a case where risk relating to a plurality of facilities including an abnormality indicating facility during the "#3 operation" becomes larger than a threshold L which is set in advance, the risk evaluation system 25 determines that the change of the maintenance implementation timing to the "#3 operation" is not possible (not established) for the reason of high risk due to maintenance work of the abnormality indicating facility. On the other hand, in a case where risk relating to the plurality of facilities including an abnormality indicating facility is set to be equal to or less than the threshold L which is set in advance during the "#3 operation", the risk evaluation system 25 determines that the change of the maintenance implementation timing to the "#3 operation" is possible (established) for the reason of low risk due to maintenance work of the abnormality indicating facility. In a case where it is determined that the change of the maintenance implementation timing is possible, the maintenance plan creation system 26 resets the maintenance implementation timing, and creates a maintenance plan after the resetting.

The component management system 27 determines whether a component used in the abnormality indicating facility can be procured at the maintenance implementation timing after the resetting (after the change), on the basis of the component management information. In a case where it is determined that the component of the abnormality indicating facility can be procured at the maintenance implementation timing on the basis of the component management information, the component management system 27 procures the component from the warehouse 31 toward the delivery destination. On the other hand, in a case where it is determined that the component of the abnormality indicating facility cannot be procured at the maintenance implementation timing on the basis of the component management information, the component management system 27 orders the component toward the component supplier, and requests the resetting of the maintenance implementation timing of the abnormality indicating facility from the maintenance plan creation system 26.

In a case where the resetting of the maintenance implementation timing is requested from the component management system 27, the maintenance plan creation system 26 performs resetting so that the maintenance implementation timing of the abnormality indicating facility is set to timing at which the component can be procured.

The risk evaluation system 25 revaluates the risk information after the implementation of maintenance work with respect to the abnormality indicating facility, and updates the risk information of the manufacture-side database 21.

As described above, according to the present embodiment, in a case where an abnormality indication is generated in the nuclear power generation plant 10, the risk evaluation system 25 can determine the need for maintenance work with respect to the abnormality indicating facility on the basis of the risk information and the abnormality diagnosis information. In a case where maintenance work with respect to the abnormality indicating facility is necessary, the maintenance plan creation system 26 can preferentially set the maintenance implementation timing of maintenance work with respect to the abnormality indicating facility in the maintenance plan. In this case, the component management system 27 can determine whether a component can appropriately procured at the maintenance implementation timing. That is, in a case where a component cannot be procured at the maintenance implementation timing, the component management system 27 can take a measure to procure a component at the maintenance implementation timing. Thus, even in a case where an abnormality indication is generated in the nuclear power generation plant 10, and maintenance work with respect to an abnormality indicating facility is performed, a component can be appropriately procured at the maintenance implementation timing, it is possible to efficiently perform maintenance work on the nuclear power generation plant 10.

In addition, according to the present embodiment, in a case where a component cannot be procured at the maintenance implementation timing, the maintenance plan creation system 26 resets the maintenance implementation timing to timing at which a component can be procured. Therefore, the component management system 27 can reliably procure a component at the maintenance implementation timing of the abnormality indicating facility.

In addition, according to the present embodiment, the abnormality indicating facility in which maintenance work is performed becomes a normal facility, and thus the risk evaluation system 25 revaluates a risk occurring in the nuclear power generation plant 10, thereby allowing the maintenance plan to be appropriately created on the basis of latest risk information.

In addition, according to the present embodiment, the risk evaluation system 25 can consider the remaining life of the abnormality indicating facility, and thus it is possible to appropriately determine the need for maintenance work with respect to the abnormality indicating facility.

REFERENCE SIGNS LIST

1: plant maintenance assisting system
10: nuclear power generation plant
11: delivery-side database
21: manufacture-side database
22: abnormality indication monitoring system
23: abnormality diagnosis system
24: remaining life evaluation system
25: risk evaluation system
26: maintenance plan creation system
27: component management system
31: warehouse

The invention claimed is:

1. A plant maintenance assisting system comprising:
an abnormality indication monitoring system that detects an abnormality indication of a nuclear power plant;
an abnormality diagnosis system that specifies an abnormal event of the nuclear power plant on the basis of a result of the detection of the abnormality indication, specifies an abnormality indicating facility associated with the specified abnormal event, and generates abnormality diagnosis information including information relating to the abnormal event and the abnormality indicating facility which are specified;
a maintenance plan creation system that creates a maintenance plan of the nuclear power plant;
a risk evaluation system that evaluates risk occurring in the nuclear power plant due to standby exception of a facility including the abnormality indicating facility, and generates risk information as a result of the evaluation wherein the standby exception refers to release of a standby state in order to perform maintenance work on a facility which is in a standby state; and
a component management system that has component management information for managing a component used in the nuclear power plant,
wherein the risk evaluation system determines a need for maintenance work with respect to the abnormality indicating facility on the basis of the risk information and the abnormality diagnosis information,
wherein in a case where it is determined that the maintenance work with respect to the abnormality indicating facility is necessary, the maintenance plan creation system sets maintenance implementation timing of maintenance work with respect to the facility including the abnormality indicating facility, in the maintenance plan,
wherein the component management system determines whether the component is able to be procured on the basis of the component management information, at the maintenance implementation timing which is set by the maintenance plan creation system,
wherein in a case where it is determined that the component is able to be procured at the maintenance implementation timing on the basis of the component management information, the component management system procures the component at the maintenance implementation timing,
wherein in a case where the component is not able to be procured at the maintenance implementation timing, the component management system requests resetting of the maintenance implementation timing from the maintenance plan creation system so that the maintenance implementation timing is set to timing at which the component is able to be procured,
the maintenance work at the nuclear power plant is carried out based on the reset maintenance plan.

2. The plant maintenance assisting system according to claim 1,
wherein the component management information includes stock information relating to a quantity in stock of the component, and
wherein the component management system updates the stock information so that the quantity in stock of the component is set to a quantity in stock compatible with the maintenance plan, on the basis of the maintenance plan which is set by the maintenance plan creation system.

3. The plant maintenance assisting system according to claim 1,
wherein the risk evaluation system updates the risk information after implementation of the maintenance work with respect to the abnormality indicating facility.

4. The plant maintenance assisting system according to claim 1, further comprising a remaining life evaluation system that evaluates a remaining life of a facility provided in the nuclear power plant,
wherein the risk evaluation system determines a need for maintenance work with respect to the abnormality indicating facility, on the basis of remaining life information of the abnormality indicating facility evaluated in the remaining life evaluation system, the risk information and the abnormality diagnosis information.

5. The plant maintenance assisting system according to claim 1, wherein the risk evaluation system evaluates a degree of the risk occurring in the nuclear power plant due to standby exception when changing the maintenance implementation timing to be advanced, in a case where the risk becomes larger than a threshold, the risk evaluation system determines that the change of the maintenance implementation timing to be advanced is not possible, in a case where the risk is equal to or less than the threshold, the risk evaluation system determines that the change of the maintenance implementation timing to be advanced is possible, and in a case where it is determined that the change of the maintenance implementation timing is possible, the maintenance plan creation system resets the maintenance implementation timing, and creates the maintenance plan after the resetting.

\* \* \* \* \*